US006254777B1

United States Patent
Hernandez et al.

(10) Patent No.: US 6,254,777 B1
(45) Date of Patent: Jul. 3, 2001

(54) PROCESS FOR BACTERIAL TREATMENT OF EFFLUENTS THAT CONTAIN AT LEAST ONE ETHER

(75) Inventors: Guillermina Hernandez, Paris; François Le Roux, Rueil Malmaison; François Fayolle, Clamart; Jean-Paul Vandecasteele, Fourqueux, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/353,628

(22) Filed: Jul. 15, 1999

(30) Foreign Application Priority Data

Dec. 28, 1998 (FR) .................................................. 98 16520

(51) Int. Cl.[7] .................................. C02F 3/00; C02F 3/34
(52) U.S. Cl. ....................... 210/611; 435/262.5; 435/830; 435/832; 435/863
(58) Field of Search ........................ 435/42, 262, 262.5, 435/830, 832, 863; 210/611

(56) References Cited

U.S. PATENT DOCUMENTS 5,814,514   9/1998   Steffan et al. .
6,040,154 * 3/2000   Fayolle .

FOREIGN PATENT DOCUMENTS 9801241   1/1998   (WO) .

OTHER PUBLICATIONS

Cowan R M et al: "Biodegradation of the Gasoline Oxygenates MTBE, ETBE, TAME, TBA, and TAA by Aerobic Mixed Cultures" Hazardous and Industrial Wastes, vol. 28, Jan. 1, 1996, pp. 523–530, XP002063584.

Yeh C K et al: "Anaerobic Biodegradation of Gasoline Oxygenates in Soils" Water Environment Research, vol. 66, No. 5, Jul. 1, 1994, pp. 744–752, XP000455239.

Steffan, Robert J. et al.: "Biodegradation of the gasoline oxygenates methyl tert–butyl ether, ethyl tert–butyl ether, and tert–amyl methyl ether by propane–oxidizing bacteria" Applied and Environmental Microbiology, vol. 63, No. 11, 1997, pp. 4216–4222, XP002115641.

French Search Report dated Sep. 17, 1999.

* cited by examiner

Primary Examiner—Chester T. Barry
(74) Attorney, Agent, or Firm—Millen, White, Zelano & Branigan, P.C.

(57) ABSTRACT

A process for treating aqueous effluents that contain at least one ether, preferably ethyl tert-butyl ether (ETBE) and/or methyl tert-butyl ether (MTBE) and/or tert-amylmethylether (TAME) to reduce the concentration of said ether is described, characterized in that in the presence of a growth substrate, at least one bacterium that is selected from the group that is formed by *Gordona terrae* CIP I-1889 and *Rhodococcus equi* CIP I-2053 is grown in aerobic conditions, and the ether that is contained in the effluents is degraded in the presence of the substrate by the biomass of the bacteria that are thus produced.

16 Claims, 1 Drawing Sheet

PROCESS FOR BACTERIAL TREATMENT OF EFFLUENTS THAT CONTAIN AT LEAST ONE ETHER

Figure 1:
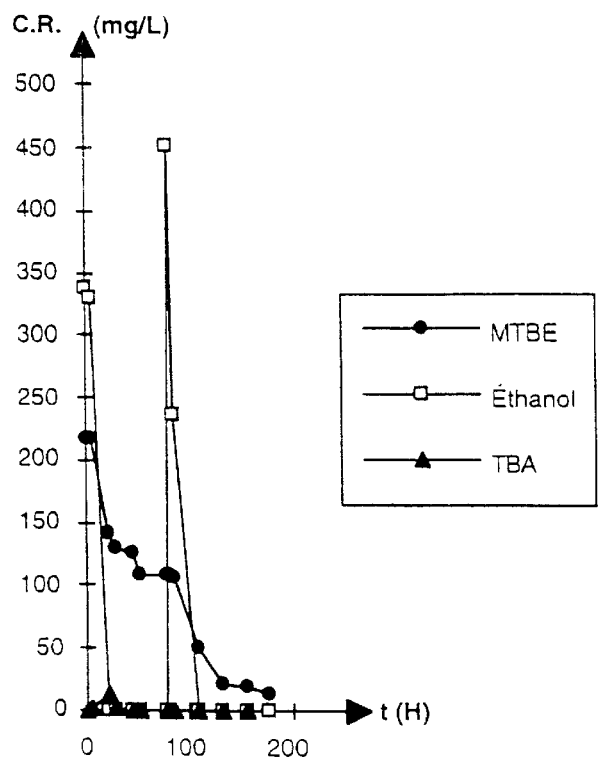

The invention relates to a process for bacterial treatment by microorganisms that are able to degrade at least one ether, particularly the methyl-tert-butyl ether and/or the tert-amyl methyl ether and/or the ethyl tert-butyl ether that are contained in aqueous effluents.

It pertains particularly to the water treatment industry.

It is known that the methyl-tert-butyl ether, which is referred to below by the term MTBE, as well as the tert-amyl methyl ether, which is referred to below by the term TAME, are ethers that can be used particularly as oxygenated additives in unleaded gasolines to enhance their octane ratings. The rising use of additives such as MTBE, TAME or ethyl tert-butyl ether, which is referred to below by the term ETBE, involves large stored and transported volumes that are mixed with gasolines in particular. It is therefore necessary to know what happens to these compounds in case of accidental dumping, leading to pollution of the soil and groundwater or surface waters. MTBE is an ether that is produced by condensation of ethanol on isobutene; TAME is an ether that is produced by condensation of the methanol on isopentene and ETBE is an ether that is produced by condensation of the ethanol on isobutene. The structure of these compounds, which comprise an ether bond as well as a tertiary carbon, is such as to make them very resistant to biodegradation by the microorganisms that are present in the environment.

Recent literature that relates to the biodegradation of alkyl ethers that are used particularly in the gasolines indicates that the metabolism of these compounds in the environment is not a common phenomenon and that it is relatively slow, both under aerobic conditions and under anaerobic conditions (Salanitro, J. P., 1995, "Understanding the Limitations of Microbial Metabolism of Ethers Used as Fuel Octane Enhancers": Curr. Op. Biotechnol., 6:337–340).

The applicant isolated aerobic bacteria *Gordona terrae* CIP I-1889 and *Rhodococcus equi* CIP I-2053 that have the capacity of degrading ETBE, and their use was the subject of a patent application (FR97/09455).

Among the previously discovered bacteria that make it possible to degrade ETBE in solution in water, ETBE is used at least partly as a carbon source by these bacteria, and its degradation ends in the accumulation of tert-butanol (TBA).

Another new aerobic bacterium was discovered by the applicant (*Pseudomonas cepacia* CIP I-2052), and this bacteria is able to use TBA as produced as a carbon source by degrading it until carbon dioxide is formed (mineralization).

The use of these two types of bacteria that degrade ETBE into TBA, on the one hand, and that mineralize TBA, on the other hand, in a mixed culture in ETBE makes possible the essentially total degradation of the ETBE that is contained in effluents.

One of the objects of the invention is to describe an aerobic process that uses these new bacteria for the treatment of polluted waters for the purpose of degrading the MTBE, ETBE or TAME that are contained in solution.

It has been noted that these microorganisms that are capable of degrading ETBE were capable of degrading MTBE and TAME and that their use in water treatment processes made it possible to lower significantly the residual concentrations of MTBE and/or TAME and more generally of compounds that contain at least one alkoxy group and in particular a tert-alkoxy group in urban or industrial waste waters or contaminated aquiferous layers, referred to under the general name of effluents, that are contaminated by these products or by fuels that can contain these oxygenated products.

In a more detailed manner, the invention relates to a process for treating aqueous effluents that contain at least one ether, advantageously methyl tert-butylether (MTBE) and/or tert-amylmethylether (TAME) and/or ethyl-tert-butyl-ether (ETBE) to reduce the concentration of said ether, characterized in that at least one bacteria that is selected from the group that is formed by *Gordona terrae* CIP I-1889 and *Rhodococcus equi* CIP I-2053 is grown in the presence of a suitable growth substrate, and the ether that is contained in the effluents is degraded in the presence of said substrate by the biomass of said bacteria that are thus produced.

According to a characteristic of the process, when the aqueous effluents contain primarily MTBE, it is possible to degrade advantageously the MTBE that is contained in the effluents by also introducing there, jointly or separately, at least one bacteria that is selected from the group that is formed by *Pseudomonas cepacia* CIP I-2052, *Arthrobacter globiformis* ATCC 53596, *Bacillus coaaulans* ATCC 53595, *Pseudomonas stutzeri* ATCC 53602 and *Mycobacterium vaccae* JOB5 ATCC 29678.

In this type of use, the tert-butylether group is degraded into tert-butyl alcohol (TBA) and the essentially total degradation of TBA into carbon dioxide and into water is carried out by the addition of bacteria that are mentioned that have the capability of advancing on the TBA that is thus produced. These stocks, *Gordona terrae* CIP I-1889, *Rhodococcus equi* CIP I-2053 and *Pseudomonas cepacia* CIP I-2052 have been filed by the applicant at the Institut Pasteur (CNCM, 25 rue du Docteur Roux, F-75724 PARIS CEDEX 15). Any other bacterium that is able to grow on the TBA can enter the framework of this invention.

According to another characteristic of the process, when the effluents contain primarily TAME, it is possible to degrade the TAME that is contained in the effluents by also introducing there, jointly or separately, a bacterium *Pseudomonas cepacia* CIP I-2052, which has the capability of also advancing on the tert-amyl alcohol (TAA) that is produced from degradation of TAME and of degrading it approximately totally into carbon dioxide and water. Any other bacterium that is able to grow on TAA can enter the framework of this invention.

According to another characteristic of the invention, the bacteria *Gordona terrae* CIP I-1889 and *Rhodococcus equi* CIP I-2053 are generally inoculated on a growth substrate, which can be, for example, at least one compound that is selected from the group that is formed by ethanol, isopropanol, n-butanol, n-pentanol, a monosaccharide, a disaccharide, dibutyl ether, ethyl butyl ether, ethyl tert-butyl ether, acetone, ethylene glycol, diethylene glycol, glycerol and tryptone.

Other growth substrates that are based on carbon and hydrogen can be provided. Each bacterium can grow differently in the presence of a given type of substrate.

Excellent results have been obtained by using ethanol and/or acetone as a growth substrate.

This particular growth substrate can be introduced at a concentration that does not exceed the toxicity threshold of this substrate for the bacterium that is being considered and advantageously between 0.1 mg/L and 5,500 mg/L of effluents.

The bacteria can tolerate a wide-range of concentrations of ether. Preferably, it is possible to degrade aqueous effluents that contain a concentration of ether, and in particular MTBE or TAME or ETBE, that is at most equal to 5,000 mg/L and more particularly between 0.01 mg/L and 400 mg/L. It is always possible, nevertheless, to dilute the effluent to operate under optimum conditions that are compatible with the degradation capacities of the bacterial stocks.

In the case where the aqueous effluents contain ethyl tert-butyl ether (ETBE) as a contaminant, this ETBE can be used at least partly as a growth substrate and therefore as an energy source.

The process that is derived from the use of these bacteria is applicable for treating in particular effluents that are polluted by MTBE, TAME and/or ETBE, so that the concentrations of MTBE or TAME or ETBE in the releases are compatible with the standards in force.

These bacteria were isolated from activated sludges that are collected at a sewage purification plant of urban waste waters that were treated according to specific microorganism enrichment techniques. The resulting bacterial stocks *Gordona terrae* CIP I-1889 and *Rhodococcus equi* CIP I-2053, which were described for degrading ETBE in Patent Application FR 97/09455 that is incorporated as a reference, were tested for their capacity of degrading MTBE and/or TAME when the latter were provided as the sole carbon source. However, contrary to the case that is described in this patent application in which the contaminant (ETBE) is used as a single carbon source and therefore as a growth substrate, no degradation of MTBE or of TAME was observed.

By contrast, during the growth on a medium that contains a growth substance other than MTBE and TAME, stocks *G. Terrae* CIP I-1889 and *R. equi* CIP I-2053 then prove capable of degrading the MTBE or TAME that is contained in aqueous effluents. This indicates that the MTBE and the TAME which are not growth substrates for these two stocks can, in the presence of a suitable growth substrate, play the role of inducing the enzymatic system that carries out their degradation.

This suggests that the process that uses *G. Terrae* CIP I-1889 and *R. equi* CIP I-2053, separately or jointly, for abating the pollution of effluents that contain MTBE or TAME will generally comprise the addition to the effluents of the growth substrate that constitutes the necessary carbon source for simultaneously making possible the growth phase of these bacteria and the degradation of MTBE or TAME.

The growth substrate can be provided continuously or in batches at a concentration such that it can ensure the provision of energy that is necessary for biodegradation, for example at a concentration that is at least equal to that of the ether that is to be degraded.

The use of these bacteria for the treatment of effluents that are polluted by MTBE, ETBE or TAME can be carried out in the following way: for example in a biofilter where the bacteria are attached to a mineral or organic substrate, or else they can be added as an inoculum to sewage purification plant sludges.

These bacteria can also be used for the treatment in situ of polluted aquifers by injecting them as an inoculum with a suitable growth substrate into wells that are drilled into the aquifer.

When said bacteria are developed on a biofilter system with a suitable volume, it is possible to introduce the ether-containing effluents, in particular MTBE, ETBE and/ or TAME, in the presence of air or oxygen in the biofilter at an adequate feed rate of 0.05 L/L to 5 L/L, for example 0.1 to 2 L/L of biofilter/hour according to the concentration of contaminant that is to be treated, and the effluent from which at least part of the ether is removed is drawn off.

Figure 2:
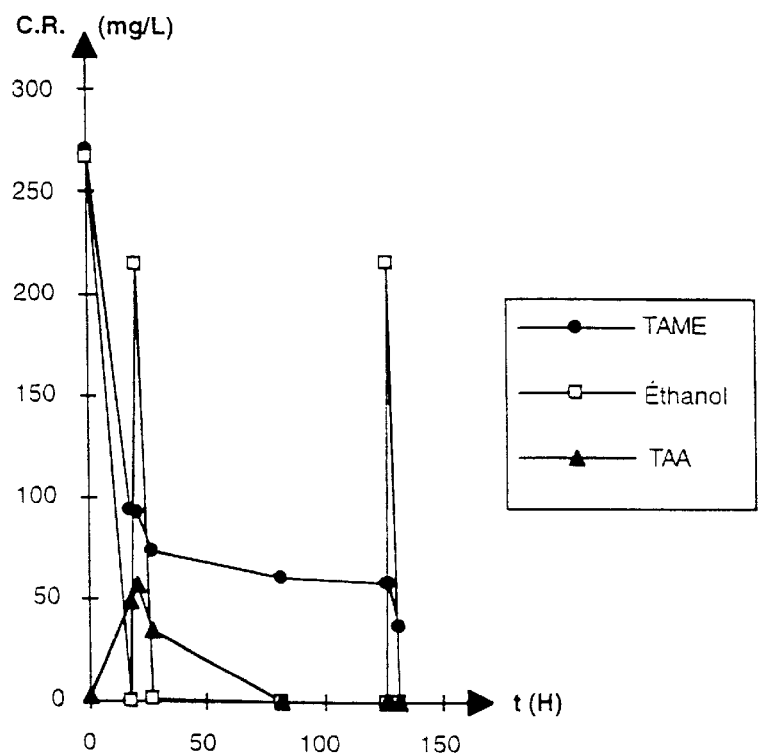

The invention will be better understood based on the following examples and figures, among which:

FIG. 1 shows the degradation capacity of MTBE of a mixed culture *Gordona terrae* CIP I-1889 and *Pseudomonas cepacia* CIP I-2052 in the presence of ethanol, and FIG. 2 illustrates the degradation capacity of TAME of a mixed culture of *Gordona terrae* CIP I-1889 and *Pseudomonas cepacia* CIP I-2052 in the presence of ethanol.

EXAMPLE 1

The capacity for degrading MTBE or TAME of the bacteria *Gordona terrae* CIP I-1889 in the presence of a growth substrate has been studied.

A preculture of *Gordona terrae* CIP I-1889 is carried out in 200 ml of the complete Luria medium whose composition is as follows:

Biotrypcase . . . 10 g

Yeast extract . . . 5 g

NaCl . . . 5 g

Glucose . . . 1 g $H_2O$ . . . q.s.p. 1 liter

The biomass that is obtained is collected by centrifuging and then inoculated in minimum medium MM1 whose composition is as follows:

$KH_2PO_4$ . . . 6.8 g $K_2HPO_4$ . . . 8.7 g $Na_2HP_4, 2H_2O$ . . . 0.334 g $NH_4Cl$ . . . 1.5 g $CaCl_2, 2H_2O$ . . . 0.0364 g $FeCl_3, 6H_2O$ . . . 0.0012 g

Vitamin solution . . . 1 mL $H_2O$ . . . q.s.p. 1 liter
pH=6.95

The vitamin solution has the following composition for 1 liter of distilled water:

Biotin . . . 200 mg

Riboflavin . . . 50 mg

Nicotinamic acid . . . 50 mg

Panthotenate . . . 50 mg

P-aminobenzoic acid . . . 50 mg

Folic acid . . . 20 mg

Thiamine . . . 15 mg

Cyanocobalamine . . . 1.5 mg

Different carbon sources at a concentration of approximately 100 mg/L are added to this medium in the presence of MTBE or TAME that are added at a concentration of approximately 100 mg/L. The carbon sources that have been tested are indicated in Table 1. The cultures are incubated at 30° C. The residual MTBE and TAME concentrations as well as the alcohol concentrations that are derived therefrom, i.e., TBA and TAA respectively, are determined in the following way: A culture sample is taken, filtered and injected into a piece of gas chromatography equipment (CPG) that is equipped with an integrator which calculates the residual concentrations by surface integration of various peaks that are obtained on the chromatograms.

The results are presented in Table 1.

It is noted that the growth cells in different carbon sources are capable of degrading the MTBE or the TAME that are added to the culture medium. These compounds are therefore capable of inducing in the stock the enzymatic activity of degradation of ethers. The degradation of ethers is carried out by what is suitably called co-metabolism since the degraded compound is not a growth substrate.

TABLE 1

Degradation Capacity of MTBE or TAME by Co-Metabolism of Gordona Terrae CIP I-1889 in the Presence of Different Carbon-Containing Substrates

| Carbon Source Tested in the Presence of Ether | % of Transformation of MTBE into TBA | % of Transformation of TAME into TAA |
|---|---|---|
| Lactose | 30.5 | 74.5 |
| Diethylene glycol | 45 | 79 |
| Butanol | 50 | 75 |
| Pentanol | 50 | 80 |
| Glucose | 54 | 100 |
| Saccharose | 65 | 100 |
| Ethylene glycol | 100 | 100 |
| Acetone | 100 | 100 |
| Isopropanol | 100 | 100 |
| Ethanol | 100 | 100 |
| ETBE | 100 | 100 |

The biomass that is used was 315 mg/L (dry weight) and the dosages were carried out after 7.5 hours of incubation.

EXAMPLE 2 (FOR COMPARISON)

The capacity of the bacterium *Gordona terrae* CIP I-1889 for degrading ETBE, MTBE or TAME that are provided as growth substrates was studied.

The bacterium *Gordona terrae* CIP I-1889 is inoculated in a flask of the Luria medium that is described in Example 1.

The cultures are incubated at 30° C.

The bacterial cells are harvested by centrifuging and used for inoculating flasks of the MM1 medium that is described in Example 1 and that contains ETBE or MTBE or TAME at a concentration of approximately 100 mg/L as a single source of carbon and energy. The cellular concentration is evaluated with the inoculation by measurement of the dry weight that is 87.5 mg/L. The cultures are then incubated at 30° C. After one week of incubation, the residual concentrations of ETBE, MTBE or TAME as well as those of the alcohols that are optionally formed are determined by CPG as described in Example 1.

In the case of incubation in the presence of ETBE, it is noted that all of the ETBE provided was degraded into TBA whereas MTBE and TAME were not degraded.

Under conditions where MTBE or TAME are provided as growth substrates, the bacterium *Gordona terrae* CIP I-1889 therefore is not capable of degrading MTBE and TAME. This is due to the fact that MTBE and TAME, contrary to ETBE, cannot be sources of carbon and energy for the bacterium.

EXAMPLE 3

The capacity for degrading MTBE or TAME in the presence of ETBE with non-proliferating cells of the bacterium *Gordona terrae* CIP I-1889 has been studied.

Cultivation of *Gordona terrae* CIP I-1889 is carried out on the MM1 medium that is described in Example 1, with the addition of ETBE at 400 mg/L that is described in Example 1. The culture is incubated at 30° C.

When ETBE has been degraded into TBA, which is measured in CPG as described in Example 1, the bacterial cells are harvested by centrifuging then incubated at a cellular concentration of 0.5 g/L of dry weight in the 0.1 M Tris HCl buffer, pH 7.0, in the presence of ETBE or in the presence of MTBE and ETBE or in the presence of TAME and ETBE, whereby each ether has a concentration of about 100 mg/L. The residual concentrations of ETBE, MTBE and TAME are determined by CPG. The degradation of ETBE and MTBE by Gordona terrae CIP I-1889 ends in the appearance of a peak of TBA and that of TAME ends in the appearance of a peak of TAA.

The specific degradation activities of ETBE, MTBE and TAME have been measured under different incubation conditions, and the values that are obtained are presented in Table 2.

It is noted that the bacterium *Gordona terrae* CIP I-1889 that is cultivated in ETBE is capable of degrading all of the ethers that are tested but at different speeds, including in a mixture.

TABLE 2

Capacity for Degradation of ETBE, MTBE or TAME of the Bacterium Gordona Terrae CIP I-1889 After Growth of the Bacterium in the Presence of ETBE

| Experiment No. | Ether Tested | Specific Degradation Activity of ETBE (in mg of degraded $ETBE.h^{-1}.g^{-1}$ of dry weight) | Specific Degradation Activity of MTBE (in mg of degraded $MTBE.h^{-1}.g^{-1}$ of dry weight) | Specific Degradation Activity of TAME (in mg of degraded $TAME.h^{-1}.g^{-1}$ of dry weight) |
|---|---|---|---|---|
| 1 | ETBE | 160 | | |
| 2 | ETBE + MTBE | 158 | 19 | |
| 3 | ETBE + TAME | 159.6 | | 72.5 |

EXAMPLE 4

The specific degradation activities of MTBE or TAME by the bacterium *Gordona terrae* CIP I-1889 was evaluated in the presence of different substrates.

The bacterium *Gordona terrae* CIP I-1889 is cultivated in 200 mL of the complete Luria medium that is described in Example 1, while being stirred at 30° C. for 24 hours. The cells are collected by centrifuging and taken up in 100 mL of minimum medium MM1 that is described in Example 1. 50 mL flasks of the MM1 medium are inoculated with this cellular suspension at a rate of 10%. The biomass content of the cellular suspension is evaluated by measurement of the dry weight.

To these media is added a carbon-containing growth substrate at a concentration on the order of 100 mg/L. The substrates that have been used are: ethanol or isopropanol or pentanol or acetone or butanol.

MTBE or TAME is then added to the flasks at a concentration on the order of 100 mg/L to evaluate their degradation in the presence of each of the growth substrates that are listed above.

The different cultures are incubated at 30° C. Samples are taken at the beginning of the experiment then every hour. The residual concentrations of MTBE and TAME as well as the concentration of derivative alcohols (TBA or TAA) are determined by CPG as described in Example 1. It is thus possible to calculate degradation rates of MTBE or TAME under different conditions and the specific activities relative to the final dry weight under different conditions. The results of these tests are presented in Table 3.

The measurement of the degradation rates make it appear that the ethanol and the acetone are particularly favorable substrates.

Furthermore, it was noted that in the presence of these different growth substrates, the bacterium degrades ETBE at least as much as TAME.

TABLE 3

Specific Degradation Activities of MTBE or TAME by Co-metabolism in the Presence of Different Carbon-Containing Substrates by the Bacterium Gordona terrae CIP I-1889

| Carbon-Containing Substrate Tested in the Presence of Ether | Specific Degradation Activity of MTBE (in mg of degraded MTBE.$h^{-1}.g^{-1}$ of dry weight) | Specific Degradation Activity of TAME (in mg of degraded TAME.$h^{-1}.g^{-1}$ of dry weight) |
|---|---|---|
| Ethanol | 34.7 | 107.2 |
| Isopropanol | 24.8 | 42.3 |
| Butanol | 24.4 | 73.5 |
| Pentanol | 22.7 | 27.5 |
| Acetone | 36.4 | 65.8 |

EXAMPLE 5

The degradation of MTBE or TAME by a mixed culture that contains *Gordona terrae* CIP I-1889 and *Pseudomonas cepacia* CIP I-2052 into a liquid culture has been studied.

The stock *Pseudomonas cepacia* CIP I-2052 is cultivated in 700 mL of minimum medium, called medium MM2, whose composition is as follows:

$KH_2PO_4$. . . 1.4 g $K_2HPO_4$. . . 1.7 g $NaNO_3$. . . 1.5 g $MgSO_4$, $7H_2O$ . . . 0.5 g $CaCl_2$, $2H_2O$ . . . 0.04 g $FeCl_3$, $6H_2O$ . . . 0.012 g

Vitamin solution . . . 1 ml $H_2O$ . . . q.s.p. 1 liter

The composition of the vitamin solution is described in Example 1.

TBA at a final concentration on the order of 200 mg/L is added to this medium. The incubation is carried out while being stirred at 30° C. for 72 hours. The cells are collected by centrifuging. The deposit is taken up in 5 mL of the same minimum medium, MM2.

The stock *Gordona terrae* CIP I-1889 is cultivated in 100 mL of the complete Luria medium that is described in Example 1, while being stirred at 30° C. for 12 hours. The cells are collected by centrifuging and taken up in 50 ML of minimum medium MM2 that is described above in this example.

Two mixed cultures are produced, i.e., that contain both the bacterium *Gordona terrae* CIP I-1889 and the bacterium *Pseudomonas cepacia* CIP I-2052, in two flasks that contain 250 mL of minimum medium MM2. Each of these flasks is inoculated with 2.5 mL of each of the cellular suspensions that are thus obtained. A mixture of ethanol and MTBE is added into one of the flasks, and a mixture of ethanol and TAME is added into the other flask.

The measurements of residual CR concentrations of ethanol, MTBE or TAME as well as the measurements of concentrations of the alcohols that are formed (TBA or TAA) are carried out by CPG as described in Example 1.

After the first addition of ethanol is consumed, the biodegradation of MTBE or TAME halts. We have then carried out successive additions of ethanol until the consumption of MTBE or TAME is greater than 90%. The results of these experiments are presented in FIGS. 1 and 2 that show the residual concentrations of substrate or contaminant to be degraded (expressed in mg/L) based on time "t" (expressed in hours). The biodegradation of the MTBE or TAME is concomitant to the degradation of the ethanol and halts after the end of the consumption of this substrate. The subsequent additions of ethanol (one at 80 hours in the case of MTBE; two respectively at 21 hours and at 126 hours in the case of TAME) are reflected, both in the case of MTBE and of TAME, by a recovery of the degradation activity of one or the other of these compounds. During these experiments, the MTBE that is provided has been degraded to 94.2% and the TAME to 91.4%.

With regard to the alcohols that are produced, TBA or TAA, FIGS. 1 and 2 show that their presence can be demonstrated when the degradation of the corresponding ether by *G. Terrae* CIP I-1889 is faster than the degradation of the alcohol by *P. cepacia* CIP I-2052. This presence, however, is only transitory. Each of the two alcohols, TBA and TAA, is completely degraded by *P. cepacia* CIP I-2052 during the period of the experiment.

EXAMPLE 6

The capacity for degrading MTBE or TAME in the presence of ETBE with non-proliferating cells of the bacterium *Rhodococcus equi* CIP I-2053 has been studied.

A cultivation of *Rhodococcus equi* CIP I-2053 is carried out in the MM1 medium that is described in Example 1, and ETBE is added at 400 mg/L that is described in Example 1. The culture is incubated at 30° C.

When ETBE has been degraded into TBA, which is measured in CPG as described in Example 1, the bacterial cells are harvested by centrifuging then incubated at a cellular concentration of 0.5 g/L of dry weight in the 0.1 M Tris HCl buffer, pH 7.0, in the presence of MTBE and ETBE or in the presence of TAME and ETBE, at a concentration in each of the ethers of 50 mg/L. The residual concentrations of ETBE, MTBE and TAME are determined by CPG. The degradation of ETBE and MTBE by *Rhodococcus equi* CIP I-2053 ends in the appearance of a peak of TBA and that of TAME ends in the appearance of a peak of TAA.

The specific degradation activities of ETBE, MTBE and TAME have been measured under different incubation conditions, and the values that are obtained are presented in Table 4.

It is noted that the bacterium *Rhodococcus equi* CIP I-2053 that is cultivated in ETBE is capable of degrading all of the ethers that are tested but at different speeds, including in a mixture.

TABLE 4

Capacity for Degradation of ETBE, MTBE or TAME of the Bacterium Rhodococcus equi CIP I-2053 after Growth of the Bacterium in the Presence of ETBE

| Experiment No. | Ether Tested | Specific Degradation Activity of ETBE (in mg of degraded ETBE.$h^{-1}.g^{-1}$ of dry weight) | Specific Degradation Activity of MTBE (in mg of degraded MTBE.$h^{-1}.g^{-1}$ of dry weight) | Specific Degradation Activity of TAME (in mg of degraded TAME.$h^{-1}.g^{1}$ of dry weight) |
|---|---|---|---|---|
| 1 | ETBE + MTBE | 40.6 | 3.9 | |
| 2 | ETBE + TAME | 51 | | 11.8 |

EXAMPLE 7

The capacity for degrading different ethers with non-proliferating cells of the bacterium *Gordona terrae* CIP I-1889 after growth on a minimum medium that contains a substrate of Example 1, in particular ETBE, has been studied.

A cultivation of *Gordona terrae* CIP I-1889 is carried out according to Example 1.

After growth, the bacterial cells are harvested by centrifuging then incubated at a cellular concentration of 0.7 g/L of dry weight in the 0.1 M Tris HCl buffer, pH 7.0, in the presence of different ethers whose structure is provided in Table 5 and the growth substrate of Example 1. The ether concentrations are determined by CPG at the beginning of the experiment. The cellular suspensions are incubated at 30° C. and the residual concentrations of ethers are then determined after 24 hours of incubation.

The percentages of degradation of different ethers are presented in Table 6.

It is noted that the bacterium *Gordona terrae* CIP I-1889 that is cultivated in ETBE is capable of degrading all of the ethers that are tested but with different degradation rates.

TABLE 5

List and Structure of the Different Ethers that are Tested

| Name of the Ether | Abbrevation | Structure |
| --- | --- | --- |
| Butyl ether ether | BEE | $CH_3-(CH_2)_3-O-CH_2-CH_3$ |
| Dibutyl ether | DBE | $CH_3-(CH_2)_3-O-(CH_2)_3-CH_3$ |
| Isopropyl ether | IPE | $(CH_3)_2-CH-O-CH-(CH_3)_2$ |
| tert-Butoxy 2-ethoxy ethane | TBEE | $(CH_3)_3-C-O-(CH_2)_2-O-CH_2-CH_3$ |
| tert-Butoxy 2-methoxy ethane | TBME | $(CH_3)_3-C-O-(CH_2)_2-O-CH_3$ |

TABLE 6

Capacity for Degradation of Different Ethers of the Bacterium Gordona terrae CIP I-1889

| Ether that is Tested | Percentage of Degradation |
| --- | --- |
| BEE | 100% |
| DBE | 100% |
| IPE | 78% |
| TBEE | 72% |
| TBME | 63% |

What is claimed is:

1. A process for treating an aqueous effluent that contains at least one ether, other than ethyl tert-butyl ether (ETBE) to reduce the concentration of said ether, characterized in that in the presence of a growth substrate, at least one bacterium selected from the group consisting of *Gordona terrae* CIP I-1889 and *Rhodococcus equi* CIP I-2053 is grown in aerobic conditions, and the ether other than ETBE that is contained in the effluent is degraded in the presence of said substrate by the biomass of said bacteria that are thus produced.

2. A process according to claim 1, wherein the at least one ether is primarily MTBE and wherein the MTBE that is contained in the effluent is degraded by introducing there jointly or separately at least one bacterium selected from the group consisting of *Pseudomonas cepacia* CIP I-2052, *Arthrobacter globiformis* ATCC 53596, *Bacillus coagulans* ATCC 53595, *Pseudomonas stutzeri* ATCC 53602 and *Mycobacterium vaccae* JOB5 ATCC 29678.

3. A process according to claim 1, wherein the ether is primarily TAME and wherein the TAME that is contained in the effluents is degraded by introducing there jointly or separately a bacterium *Pseudomonas cepacia* CIP I-2052.

4. Process according to claim 1 wherein the bacteria *Gordona terrae* CIP I-1889 or *Rhodococcus equi* CIP I-2053 and *Pseudomonas cepacia* CIP I-2052 are previously withdrawn from an activated sludge.

5. A process according to claim 1, wherein the growth substrate is at least one compound selected from the group consisting of ethanol, isopropanol, n-butanol, n-pentanol, a monosaccharide, a disaccharide, dibutyl ether, ethyl butyl ether, ethyl tert-butyl ether, acetone, ethylene glycol, diethylene glycol, glycerol and tryptone.

6. A process according to claim 1, wherein the growth substrate is ethanol and/or acetone.

7. A process according to claim 1, wherein the growth substrate is at a concentration that is at least equal to that of the ether that is to be degraded.

8. A process according to claim 1, wherein the MTBE is present in a concentration of the effluent at most equal to 5.

9. A process according to claim 8, wherein the concentration is between 0.01 mg/l and 400 mg/l.

10. A process according to claim 1, wherein the TAME is present in a concentration of the effluent at most equal to 5.

11. A process according to claim 10, wherein the concentration is between 0.01 mg/l and 400 mg/l.

12. A process according to claim 1, wherein said bacteria are developed in a biofilter system of, the effluents that contain said ether are introduced in the presence of air or oxygen in the biofilter at a feed rate of 0.05 to 5 L/L of biofilter/hour, and the effluents from which at least part of the ether is removed are drawn off.

13. A process according to claim 1, wherein the aqueous effluents are an aquifer and wherein as an inoculum, said bacteria with the growth substrate are injected in the presence of air or oxygen by wells that are drilled into said aquifer.

14. A process according to claim 1, wherein said ether contains an alkoxy group.

15. A process according to claim 1, wherein said ether contains a tert-alkoxy group.

16. An isolated bacterium selected from the group consisting of *Gordona terrae* CIP I-1889 and *Rhodococcus equi* CIP I-2053, and *Pseudomonas cepacia* CIP I-2052.

* * * * *